US006070509A

United States Patent [19]

Lonn et al.

[11] Patent Number: 6,070,509

[45] Date of Patent: Jun. 6, 2000

[54] METHOD FOR ULTRASONIC CUTTING OF FOOD PRODUCTS

[75] Inventors: James C. Lonn, Naperville; Thomas J. Rakowski, Northbrook, both of Ill.

[73] Assignee: Colbourne Corporation, Glenview, Ill.

[21] Appl. No.: 08/932,527

[22] Filed: Sep. 18, 1997

[51] Int. Cl.[7] .............................. B23D 25/04; B26D 5/08

[52] U.S. Cl. .................................... 83/34; 83/37; 83/318; 83/370; 83/932; 99/486

[58] Field of Search ................................ 83/37, 49, 318, 83/319, 932, 34, 556, 360, 365, 370, 372; 99/488, 537

[56] References Cited

U.S. PATENT DOCUMENTS

| | | | |
|---|---|---|---|
| 1,357,241 | 11/1920 | McGee | 83/407 |
| 3,178,974 | 4/1965 | Roess | 83/76 |
| 3,310,855 | 3/1967 | Orioli | 425/383 |
| 3,573,859 | 4/1971 | Sederberg | 83/34 |
| 3,589,222 | 6/1971 | Sederberg | 83/49 |
| 3,800,363 | 4/1974 | Lapeyeyre | 17/52 |
| 3,958,482 | 5/1976 | Claesson | 83/559 |
| 4,386,465 | 6/1983 | Ezaki | 30/114 |
| 4,391,168 | 7/1983 | Gerber et al. | 83/34 |
| 4,523,500 | 6/1985 | Maruyama | 83/37 |
| 4,554,852 | 11/1985 | Sauer et al. | 83/407 |
| 5,195,410 | 3/1993 | Young . | |
| 5,216,614 | 6/1993 | Kuchta et al. | 364/470 |
| 5,228,372 | 7/1993 | Harrop et al. | 83/13 |
| 5,301,587 | 4/1994 | Blaimschein | 83/870 |
| 5,365,816 | 11/1994 | Rudy | 83/177 |
| 5,799,555 | 9/1998 | Biagiotti | 83/38 |

FOREIGN PATENT DOCUMENTS

| | | |
|---|---|---|
| 0353415A1 | 7/1990 | European Pat. Off. . |
| 2087290 | 5/1982 | United Kingdom . |
| 2246739 | 12/1992 | United Kingdom . |
| WO95/30518 | 11/1995 | WIPO . |
| WO96/09919 | 4/1996 | WIPO . |

*Primary Examiner*—M. Rachuba
*Assistant Examiner*—Stephen Choi
*Attorney, Agent, or Firm*—Meroni & Meroni; Charles F. Meroni, Jr.

[57] ABSTRACT

A conveyor moves food product, such as pies or cakes, within a cutting range of a knife positioning assembly. The knife positioning assembly supports an ultrasonic knife assembly which has a blade adapted for cutting the food product. The knife assembly is disposed above the conveyor and is moved to the food product in a cutting position therewith when the conveyor has the food product within the cutting range. The knife assembly is movable through at least two axes by the positioning assembly for positioning and cutting with the blade.

6 Claims, 13 Drawing Sheets

METHOD FOR ULTRASONIC CUTTING OF FOOD PRODUCTS

BACKGROUND OF THE INVENTION

1. Field of the Invention

The present invention relates generally to ultrasonic cutting. More particularly, the invention pertains to an improved method for ultrasonic cutting of food products for use in automated systems.

2. Description of the Prior Art

Commercial food products are typically prepared in bulk sizes which are cut into desired dimensions. It is highly desirably that the cut food product is of visually good appearance with minimal waste. Poor cutting can result in deformed, crushed, or torn product with significant waste.

In recent years, the application of ultrasonic food cutting has been introduced which provides many significant benefits for use in commercial food processing applications. For example, the quality of the cut face is especially clean in visual appearance, multi-layer food products can be easily cut without smearing of the layers, and the cutting operation is especially sanitary in comparison to conventional cutting methods, which is of significant importance in the food preparation industry.

In known ultrasonic food product cutting machines, a cutting blade is generally caused to vibrate at 20–40 kHz to move a cutting tip of the blade rapidly back and forth. This very high frequency movement effectively reduces the co-efficient of friction to a very low level, enabling the blade to slide through the food product.

After each cut, a food product can be repositioned by a rotary table, for example, where multiple cuts in the product are desired. It may be appreciated that the proper positioning of the food product with the ultrasonic cutter is important, especially in cutting bakery products, such as pies and cakes, where the multiple cuts of the bakery product are to converge at a center point. However, movements of the food product to the ultrasonic cutter can often become problematic resulting in damage to the appearance of the product. Many food products, such as multi-layer bakery products, become relatively unstable after multiple cuts have been made. Accordingly, the start and stop motion of the food product to move and position the product to the ultrasonic cutter can become undesirable where damage to an unstable product occurs.

As will be described in greater detail hereinafter, the method of the present invention differs from those previously proposed and employs a number of novel features that render it highly advantageous over the prior art, as well as solving the aforementioned problems.

SUMMARY OF THE INVENTION

Accordingly, it is an object of this invention to provide a method for ultrasonic cutting food products which moves the cutting assembly to and about the food product for effectuating cuts of the food product in comparison to prior art ultrasonic cutting systems which move the food product to the cutter.

Another object of this invention is to provide a method designed for use in automated systems of commercial food processing.

Still another object of this invention is to provide a method which allows for increased production capacity.

Yet another object of this invention is to provide a method which is well suited for cutting multi-layer food products, such as cakes and other bakery products, where such products typically require multiple cuts which render the product relatively unstable.

To achieve the foregoing and other objectives, and in accordance with the purposes of the present invention a method of ultrasonic cutting of food product is provided which includes the steps of: moving the food product on a conveyor; providing an ultrasonic knife assembly having a blade adapted for cutting the food product; moving the knife assembly along a horizontal x-axis and/or a horizontal y-axis perpendicular to the x-axis to a cutting position when the conveyor has moved the food product within a cutting range; and cutting the food product with the blade of the knife assembly by vibrating the blade at an ultrasonic frequency while moving the blade into the food product by lowering the blade through a vertically oriented z-axis.

Other objects, features and advantages of the invention will become more readily apparent upon reference to the following description when taken in conjunction with the accompanying drawings, which drawings illustrate several embodiments of the invention.

DETAILED DESCRIPTION OF THE PREFERRED EMBODIMENT

Figure 1:
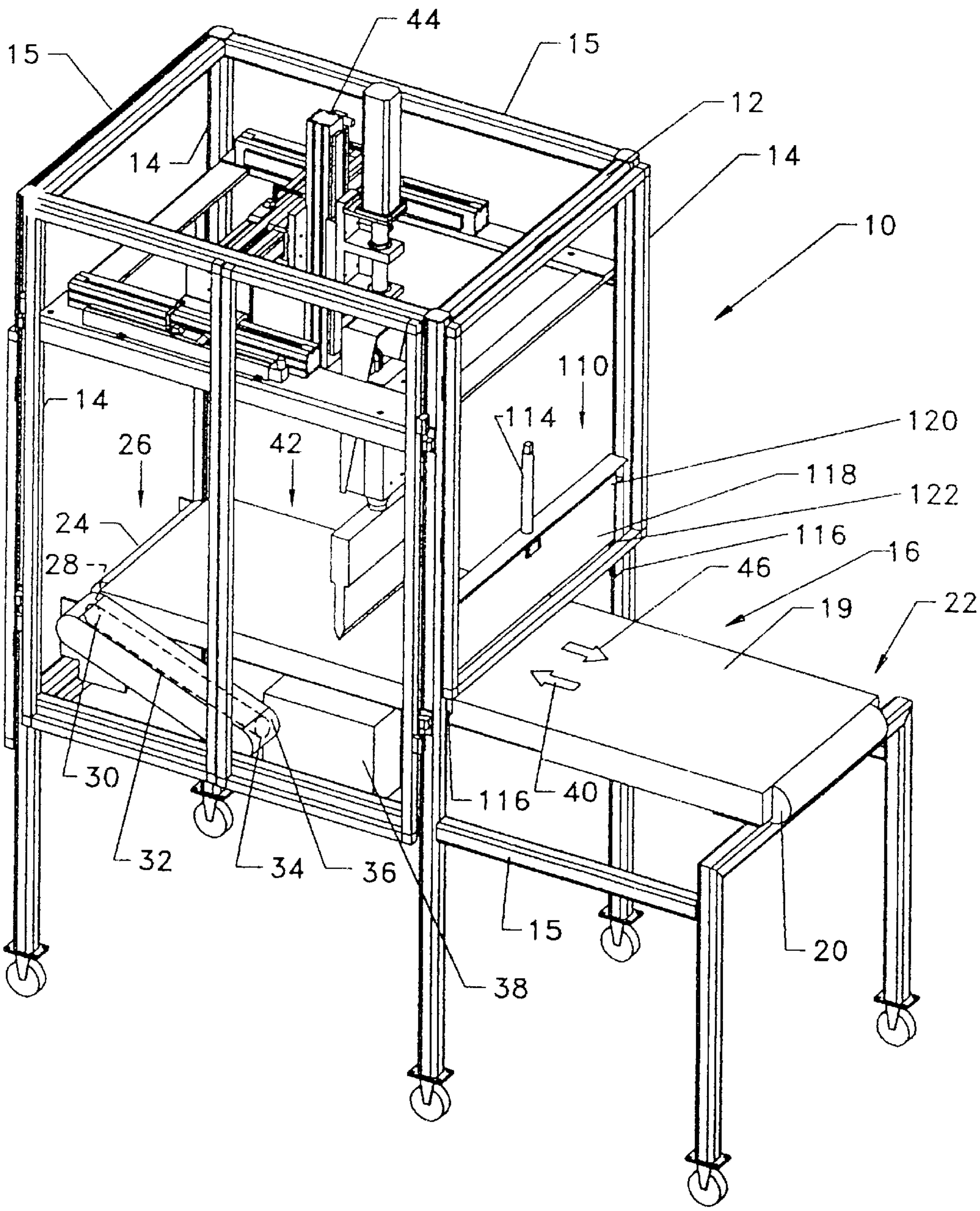
FIG. 1 is a perspective view of a first embodiment of the present invention.

Referring now to the drawings, an ultrasonic food product cutting apparatus 10 is illustrated in FIG. 1 for cutting food products.

The apparatus 10 includes a base frame 12 formed of a plurality metal vertical and horizontal frame members 14,15 secured to one another. An infeed conveyor or conveyor assembly 16 is mounted to the base frame 12 for moving a food product 18 (FIG. 7) supported thereon. The conveyor assembly 16 includes a conveyor belt 19 mounted for rotation on an idler roller 20 mounted at a first or infeed end 22 of the conveyor assembly 16 and a drive roller 24 mounted at a second end 26 of the conveyor assembly 16. A drive shaft 28 extends from the drive roller 24 is connected to a sprocket 30. Chain 32 is operatively connected between sprocket 30 and motor sprocket 34. A shaft 36 is connected between sprocket 34 and an electric drive motor 38 of conventional design which provides rotational forces to drive the conveyor assembly 16 which is controlled by an infeed conveyor controller 17 (FIG. 8). It should be understood that other drive mechanisms of known design could be employed to drive the conveyor assembly 16.

In a first embodiment of apparatus 10 shown in FIG. 1, the apparatus is constructed for use in a indexing type mode where a food product is conveyed in a first direction indicated by the numeral 40 to a stationary position within a cutting range 42 of an ultrasonic knife positioning assembly 44. After cutting, as later described, the food product is conveyed away from the positioning assembly by moving the food product in the first direction 40, or alternatively in a second direction indicated by the numeral 46.

Figure 2:
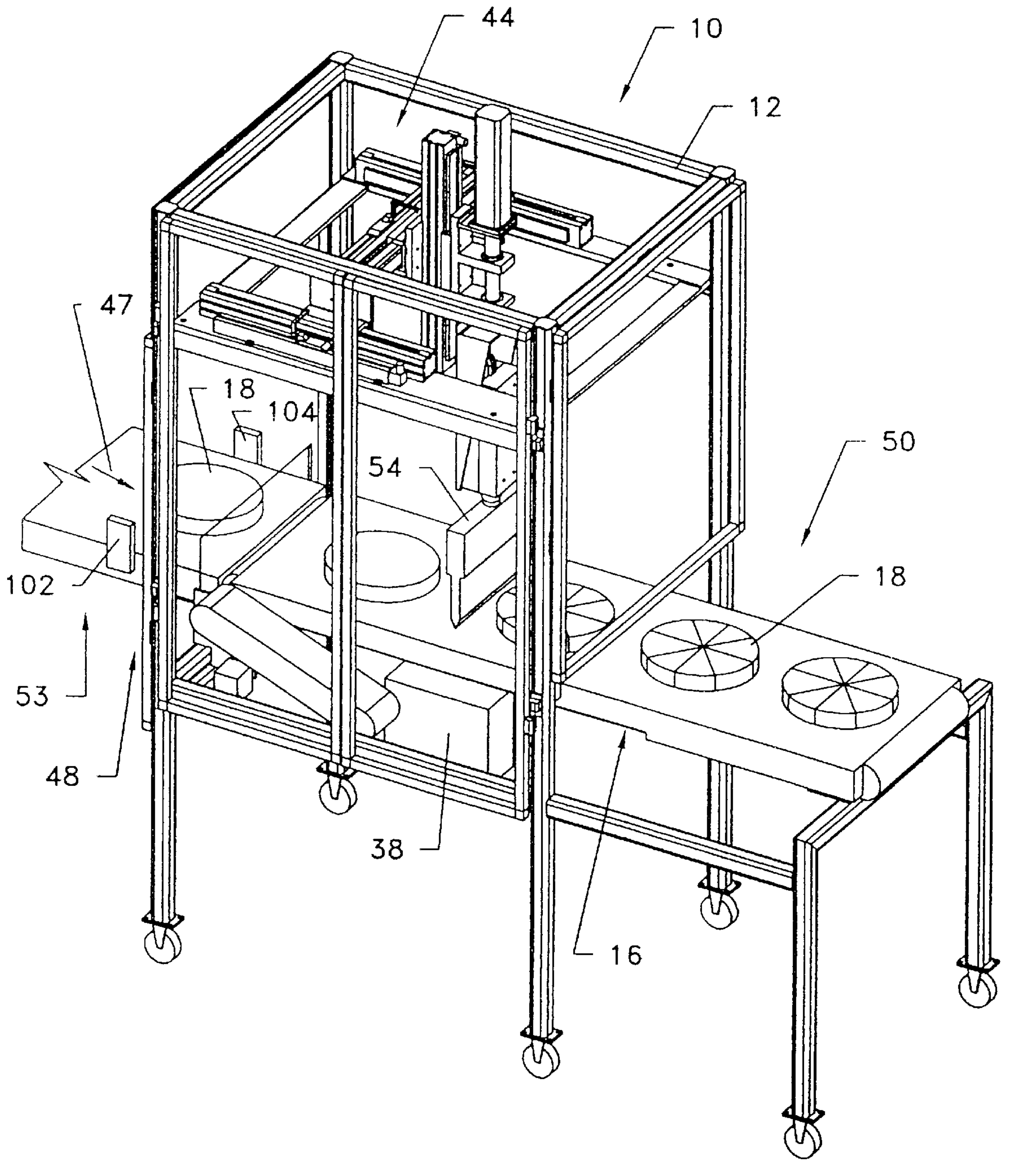
FIG. 2 is a perspective view of a second embodiment of the present invention.

Preferably, the apparatus 10, as shown in a second embodiment of FIG. 2, includes a conveyor assembly 16 which operates continuously to move the food product 18 in a single horizontal direction indicated by the numeral 47 from an infeed end 48 to an outfeed end 50. Additional conveyor assemblies 53 constructed similarly to conveyor assembly 16 may be provided at the infeed and outfeed ends 48,50 for moving the food product 18 in an automated system to a succeeding food processing or packaging station.

Figure 4:
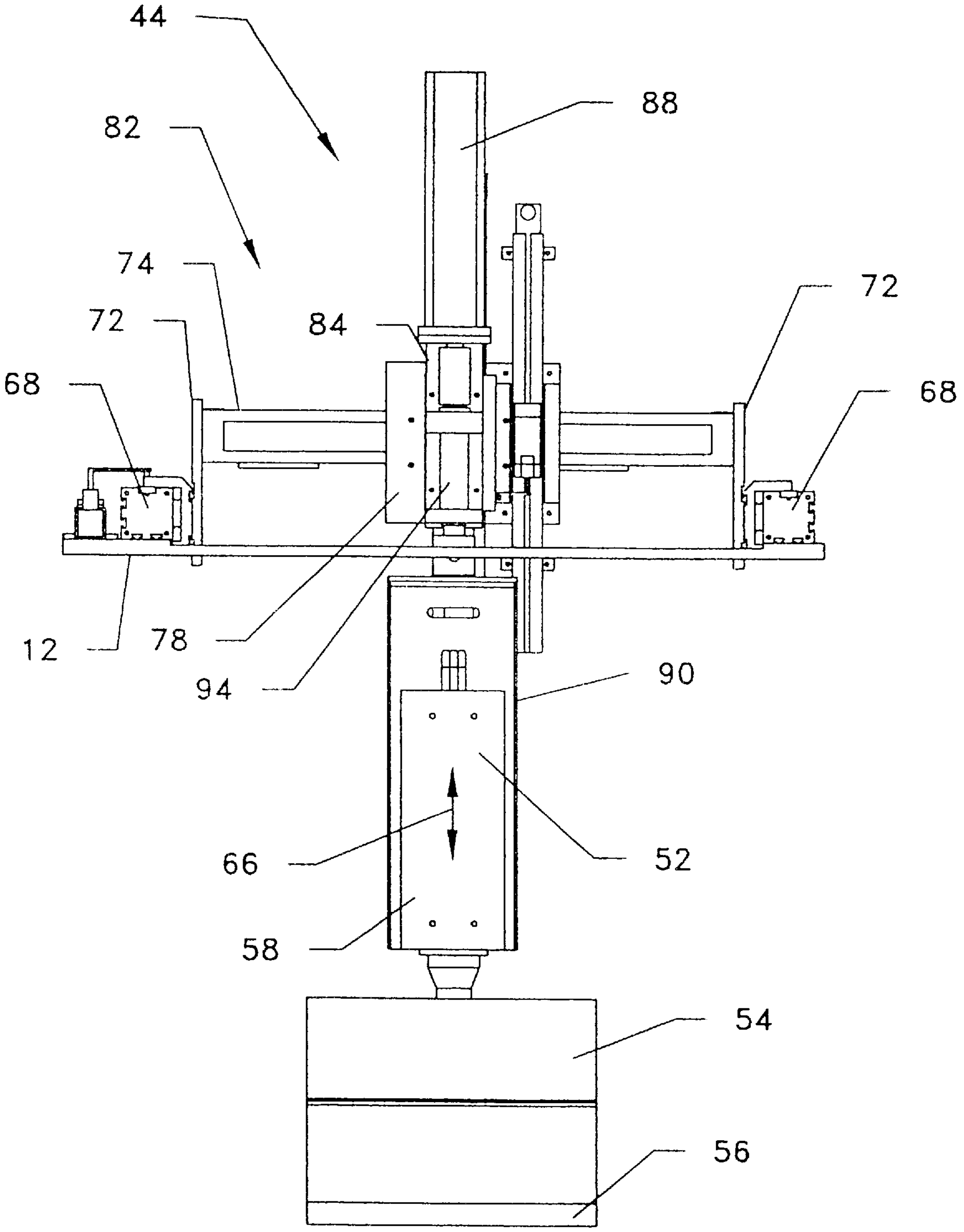
FIG. 4 is side view of the knife positioning assembly taken along line 4—4 of FIG. 3.

Referring to FIG. 4, an ultrasonic knife assembly 52 has a blade 54 adapted for cutting the food product 18. The cutting action is a combination of the sharp cutting edge 56 and mechanical vibration of the blade 54. The blade 54 is designed to vibrate generally between 20 to 40 khz depending on the type of food product 18 in a longitudinal or piston type mode and is driven by an electromechanical transducer 58 including an ultrasonic generator and amplifier. The ultrasonic knife assembly 52 per se may be of the type commercially available for use in food cutting.

Figure 3:
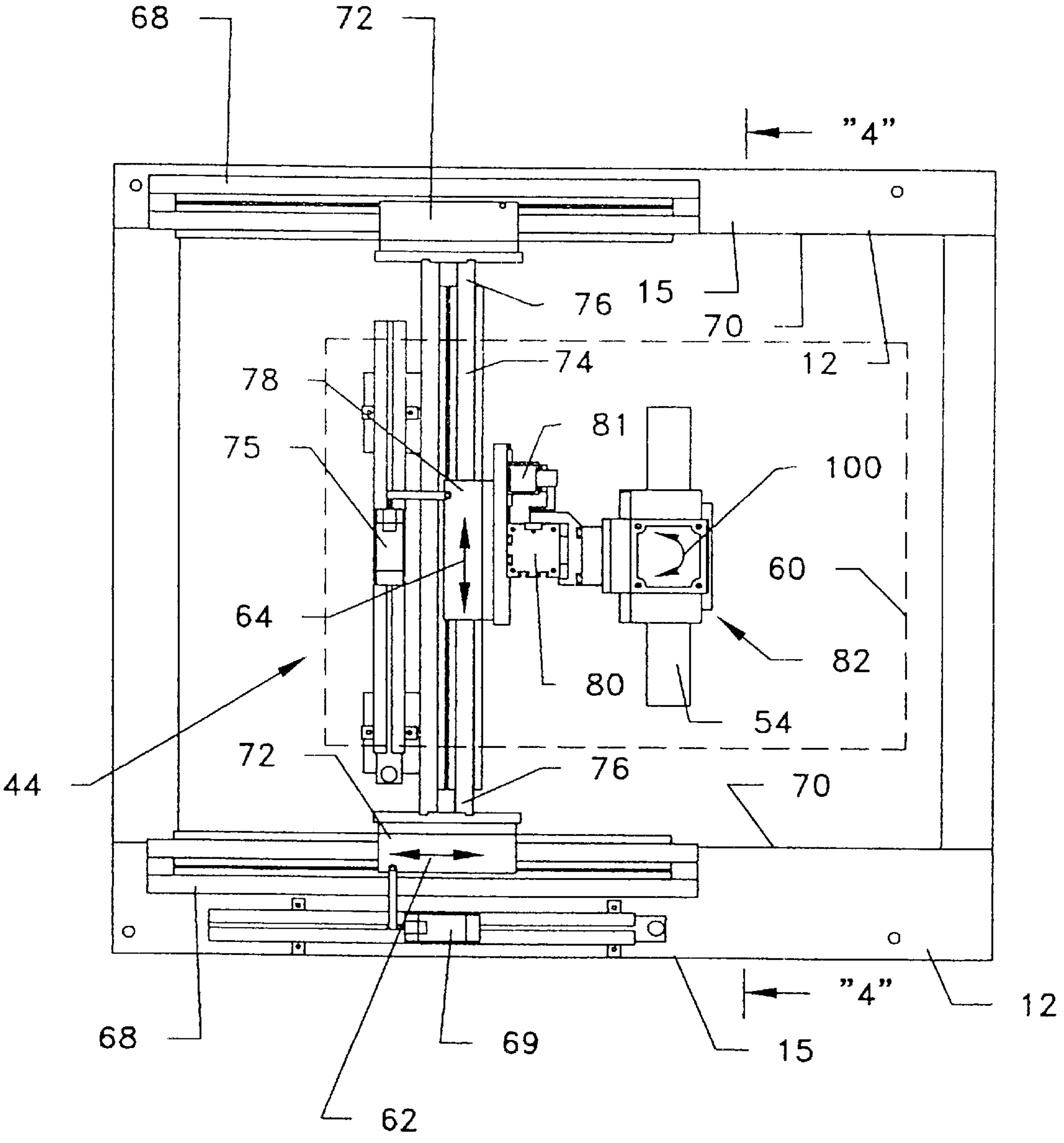
FIG. 3 is an enlarged plan view of one embodiment of an ultrasonic knife positioning assembly for use with the first and second embodiments of the present invention.

Referring to FIGS. 3 and 4, the ultrasonic knife positioning assembly 44 is mounted to the base frame 12 and supports the ultrasonic knife assembly 52 above the conveyor belt 19 for moving the knife assembly 52 to the food product in a cutting position. The area of the cutting position is indicated by the numeral 60 (FIG. 3). The knife positioning assembly 44 provides movement of the knife assembly 44 about an x-axis 62, y-axis 64, and z-axis 66.

A pair of servopneumatic x-cylinders 68 are secured to horizontal members 15 on opposite sides 70 of the frame 12. The x-cylinders 68 extend parallel to one another in a spaced apart relationship. An x-y cylinder connection bracket 72 is mounted to each of the x-cylinders 68 for movement in the x-axis 62 therewith. One of the x-cylinders 68 includes an x-transducer 69 operatively connected therewith. A servopneumatic y-cylinder 74 has opposite ends 76 with each end 76 mounted to one of the brackets 72. The y-cylinder 74 extends perpendicular to the x-cylinders 68 and generally across the width of the conveyor belt 19. A y-z connection bracket 78 is mounted to the y-cylinder 74 for movement in the y-axis 64 therewith. The y-cylinder 74 includes a y-transducer 75 operatively connected therewith. A servopneumatic z-cylinder 80 is mounted to the bracket 78 and extends vertically to provide movement in the z-axis 66 or vertical plane perpendicular to the planes of movement of the x-cylinders 68 and y-cylinder 74. The z-cylinder 80 includes a z-transducer 81 operatively connected therewith.

With respect to the servopneumatic cylinders 68,74,80, and corresponding transducers 69,75,81, these components per se are of conventional design and it should be understood that other known motor or actuator assemblies could be employed with the present invention, such as electric servomotors, servohydraulics, and mechanical drive mechanisms, where such assemblies would be configured in accordance with teachings of the present invention.

Figure 5:
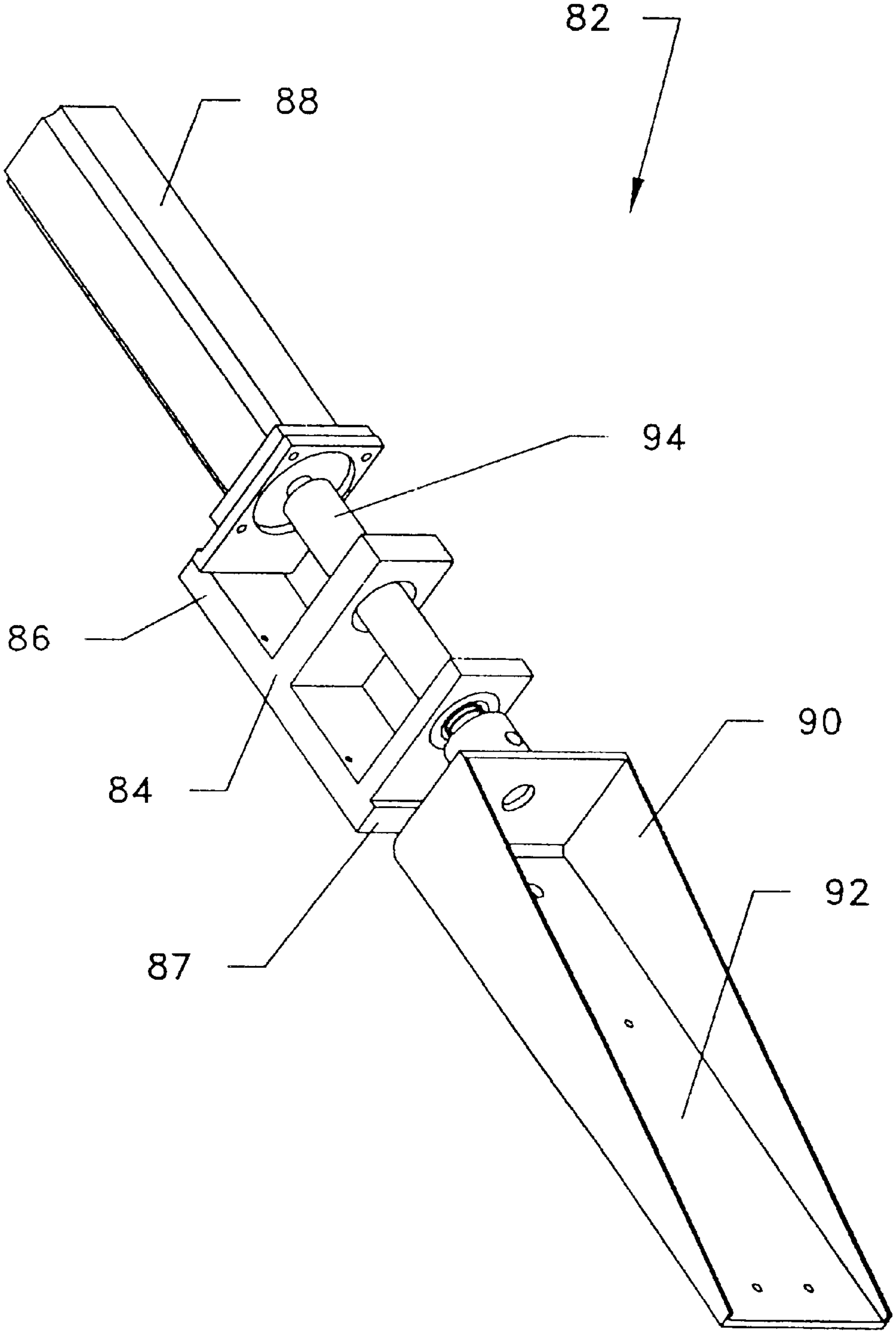
FIG. 5 is a perspective view of a rotary axis assembly.

Referring to FIGS. 3–5, a rotary motor assembly 82 is connected to the z-cylinder for movement therewith and provides rotational movement of the knife assembly 52 about the z-axis 66. The rotary motor assembly 82 includes a bracket 84 having upper and lower portions 86,87. A rotary motor and reducer 88 of conventional design is secured to the upper portion 86. A knife assembly support 90 is rotationally secured at the lower portion 87 of the bracket 84. The knife support 90 includes a mounting plate 92 adapted to mount the ultrasonic knife assembly 52 in fixed assembly therewith, as best illustrated in FIG. 4. A shaft 94 is interconnected between the motor 88 and knife assembly support 90 for transmitting rotational forces from the motor 88 to the knife assembly support 90.

Figure 7:
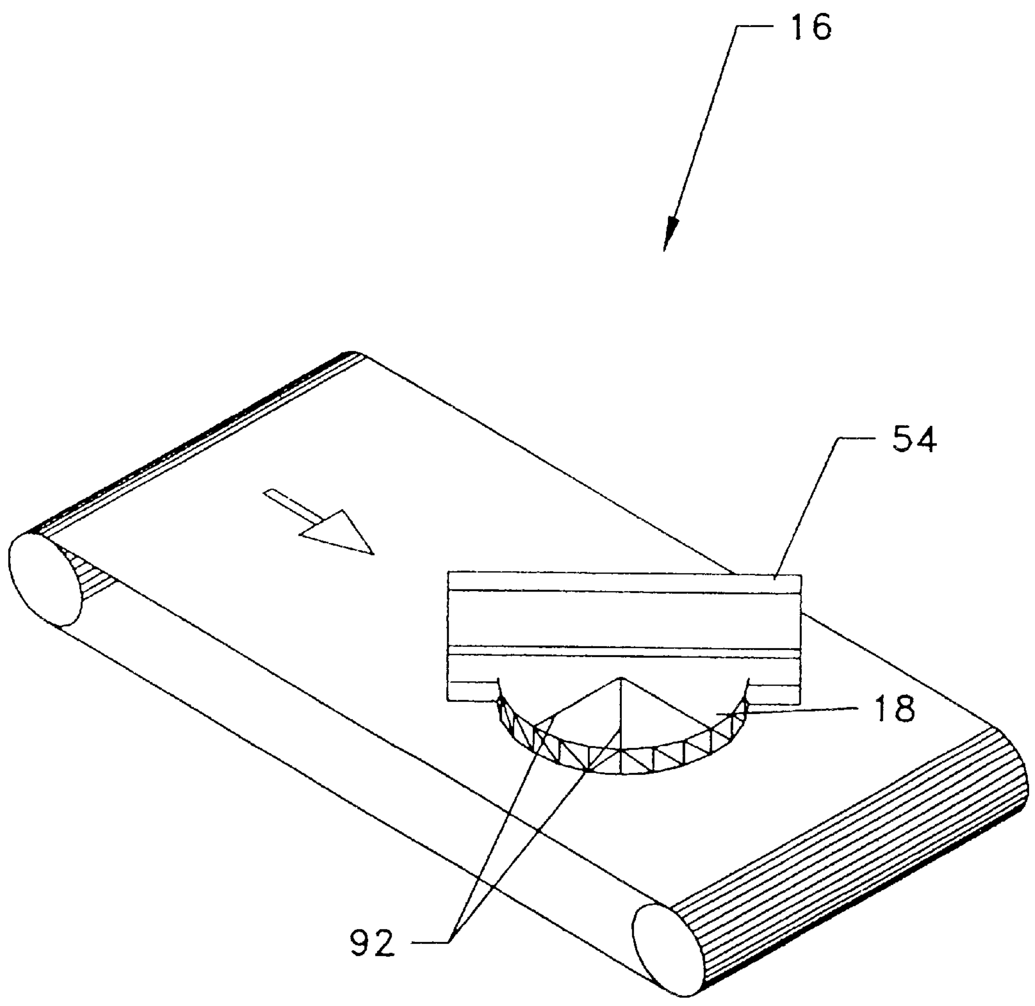
FIG. 7 is a diagrammatic perspective view illustrating a series of ultrasonic cuts being applied to a round shaped food product.
Figure 8:
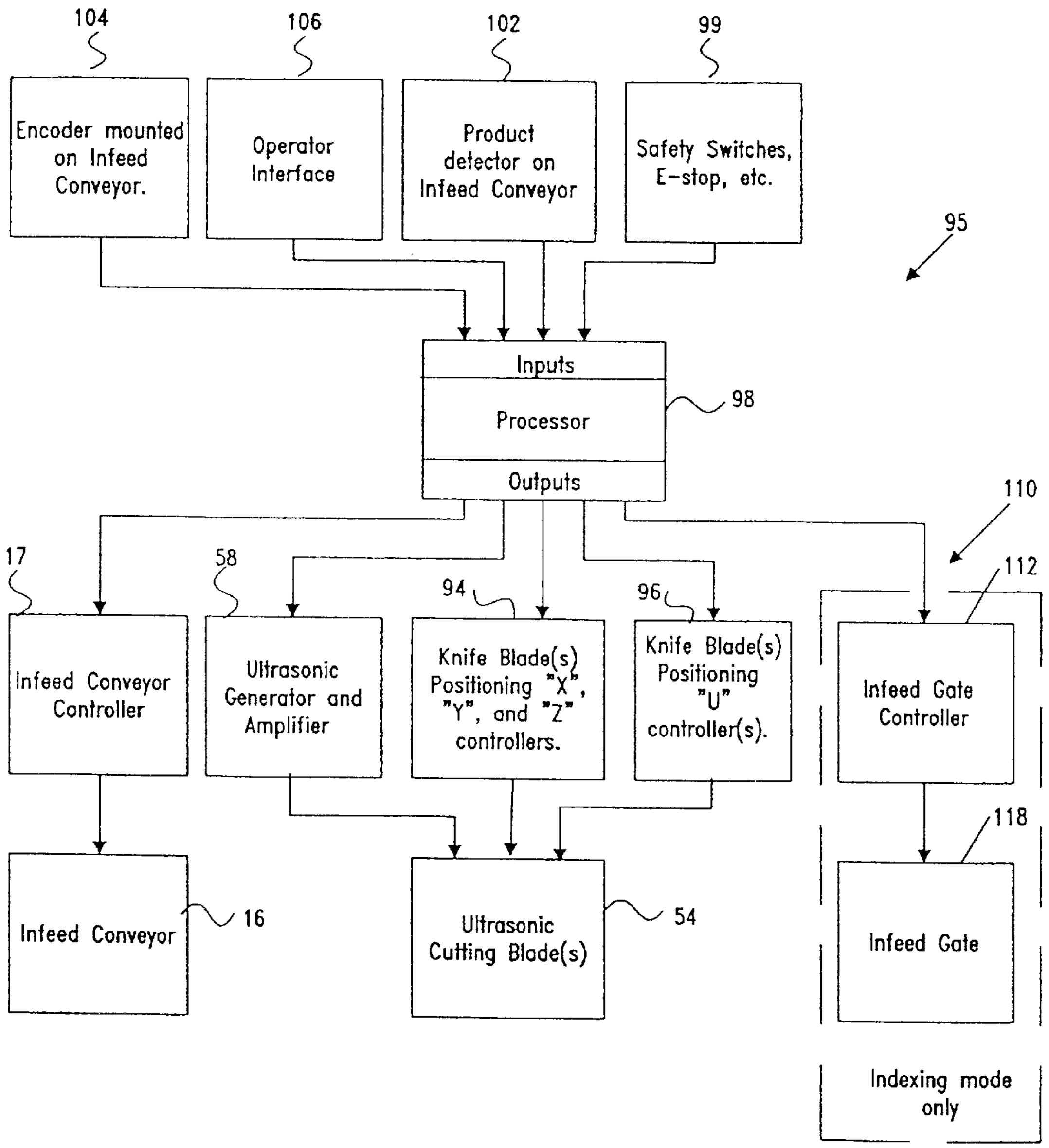
FIG. 8 is a block diagram of the present invention.

In a preferred embodiment shown in FIG. 7, the motor 88 provides up to 360° of rotation to the knife assembly support 90 to allow for pie shaped cuts 92 in round food products where the blade 54 is center positioned above the food product 18 such that 180° of rotation of the blade 54 can produce cuts 92 at 360° around the food product 18.

Referring to FIG. 8, a control system 95 of the apparatus 10 is illustrated. Each of servopneumatic cylinders 68,74,80 are electronically connected to respective controllers 94. The rotary motor assembly 82 is electronically connected to controller 96. In turn the controllers 94,96 work together to move the cutting blade 54 to specified positions dictated by a processor 98. The processor 98 is preferably a programmable logic controller or personal computer based system of conventional design. In the preferred embodiment, the controllers 94,96 and processor 98 operate using control algorithms which include a command signal to cause motion, a driver to respond to the command signal, and a feedback system which indicates the actual position of the system.

With this control logic, the acceleration, speed, deceleration, and position of the cylinders can all be controlled to prescribed limits. Thus the cutting blade 54 can be accelerated to the proper speed, maintained at that speed, decelerated to a stop, and returned to the stop position.

In the preferred embodiment shown in FIG. 2, the knife assembly 52 is moved at a rate of speed synchronous to a rate of speed of the moving conveyor 16 for maintaining the cutting position for a specific time period to allow the ultrasonic knife assembly 52 to effectuate a cut. In particular, the first part of the motion required for the x-axis consists of accelerating the cutting blade 54 to a linear speed that is the same as the linear speed of the conveyor 16 within the prescribed distance and time. The speed of the cutting blade 54 is then maintained at the matching speed to the conveyor 16 while the cut or cuts are being made. At the end of the cut, the cutting blade 54 is decelerated to a stop. The cutting blade 54 is then returned to its original position.

The motion required for the y-axis is a movement to adjust the position to align the cutting blade 54 with the food product 18. The motion consists of an acceleration portion, a constant speed portion if required, and a deceleration portion to a stop at the final position.

The motion required for the z-axis is a smooth movement down to perform the product cut and a rapid retraction of the blade 54 from the food product 18. The ultrasonic knife assembly 52 is activated at the start of the motion and deactivated after the return of the cutting blade to its original vertical position. The motion consists of a high acceleration period to obtain the required cutting speed, fast advance into the product at cutting speed, decelerating rapidly to a predetermined stop position which is sufficient to cut the product 18 but not damage the carrier of the product 18 or the conveyor 16, a rapid acceleration to the required retraction speed, retraction of the cutting blade 54 from the product 18, and then stopping at its original position. The stops on both the top and bottom of the travel are programmable by use of the control system 95 with processor 98.

The motion required for rotation about an θ axis 100 (FIG. 3) is a rapid rotary motion to move the cutting blade 54 from one rotary orientation to another. The motion consists of a high acceleration period, high speed rotary movement and high deceleration period to rotate the blade 54 from its initial position to its next required position. The cutting blade 54 can be activated at each position and the cutting can be accomplished by the proper movement in the z-axis as described above. After the final cut is made, the cutting blade 54 is rotated back to its original position.

Referring to FIGS. 2 and 8, a product detector or sensor 102, such as a photoelectric sensor or vision camera of the type known in the art of optical sensing, is mounted at the infeed end 22 of the conveyor 16 and is electronically connected with the controllers 94 of the knife positioning assembly 44 through the processor 98 to sense the proximity of the food product 18 within the cutting range 42. The control system 95 is responsive to the sensor 102 to cause the knife positioning assembly 44 to move the knife assembly 52 to the food product 18 in the cutting position and for movement about the food product 18 for positioning the knife assembly 52 to effectuate a series of preselected cuts as desired. An encoder 104 is mounted at the infeed end 22 of the conveyor 16 and is electronically connected to the processor 98 for determining exact position and dimensions of the food product 18 as it moves past the product detector 102 at a specific rate of speed on the conveyor 16. Safety switches and electronic stop mechanisms 99 of conventional design may be employed to automatically stop the operation of the apparatus 10 when in use pursuant to a particular selected conditions being satisfied.

Figure 6:
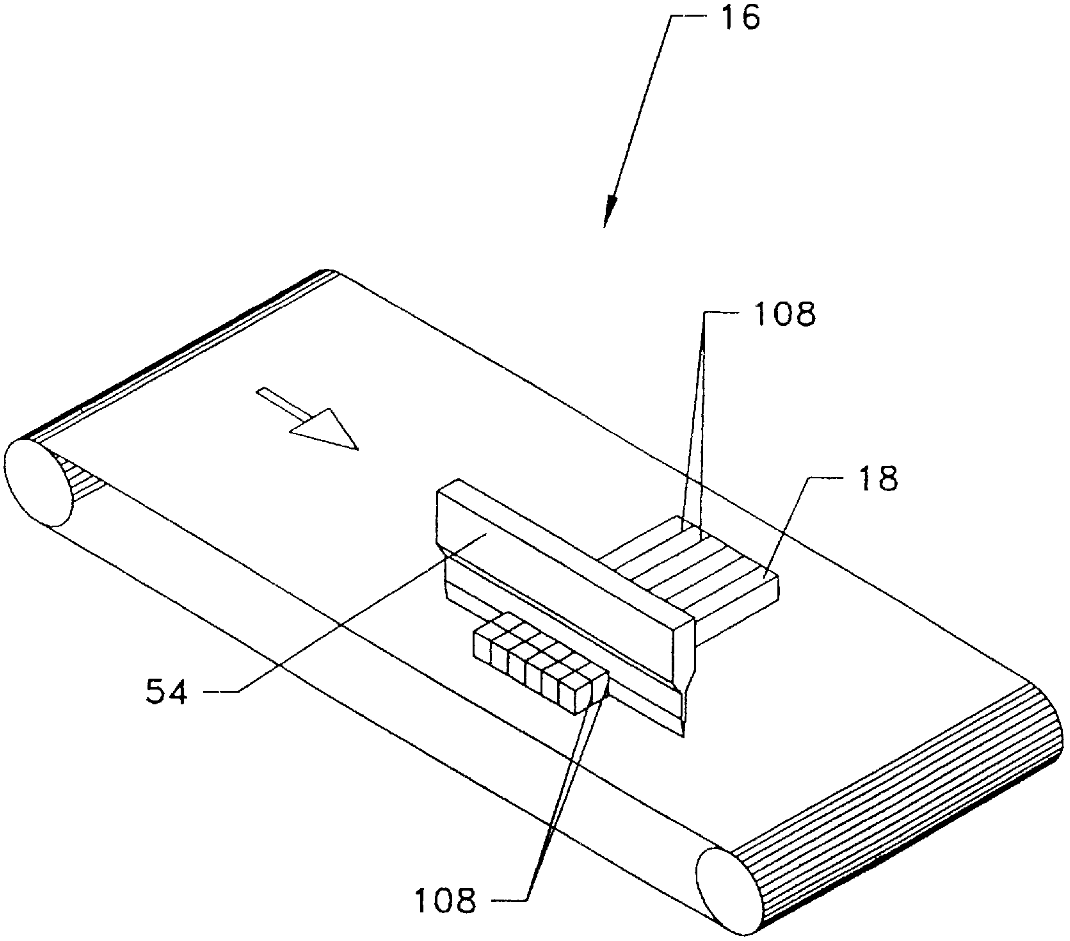
FIG. 6 is a diagrammatic perspective view illustrating a series of ultrasonic cuts being applied to a rectangular shaped food product.
Figure 9A:
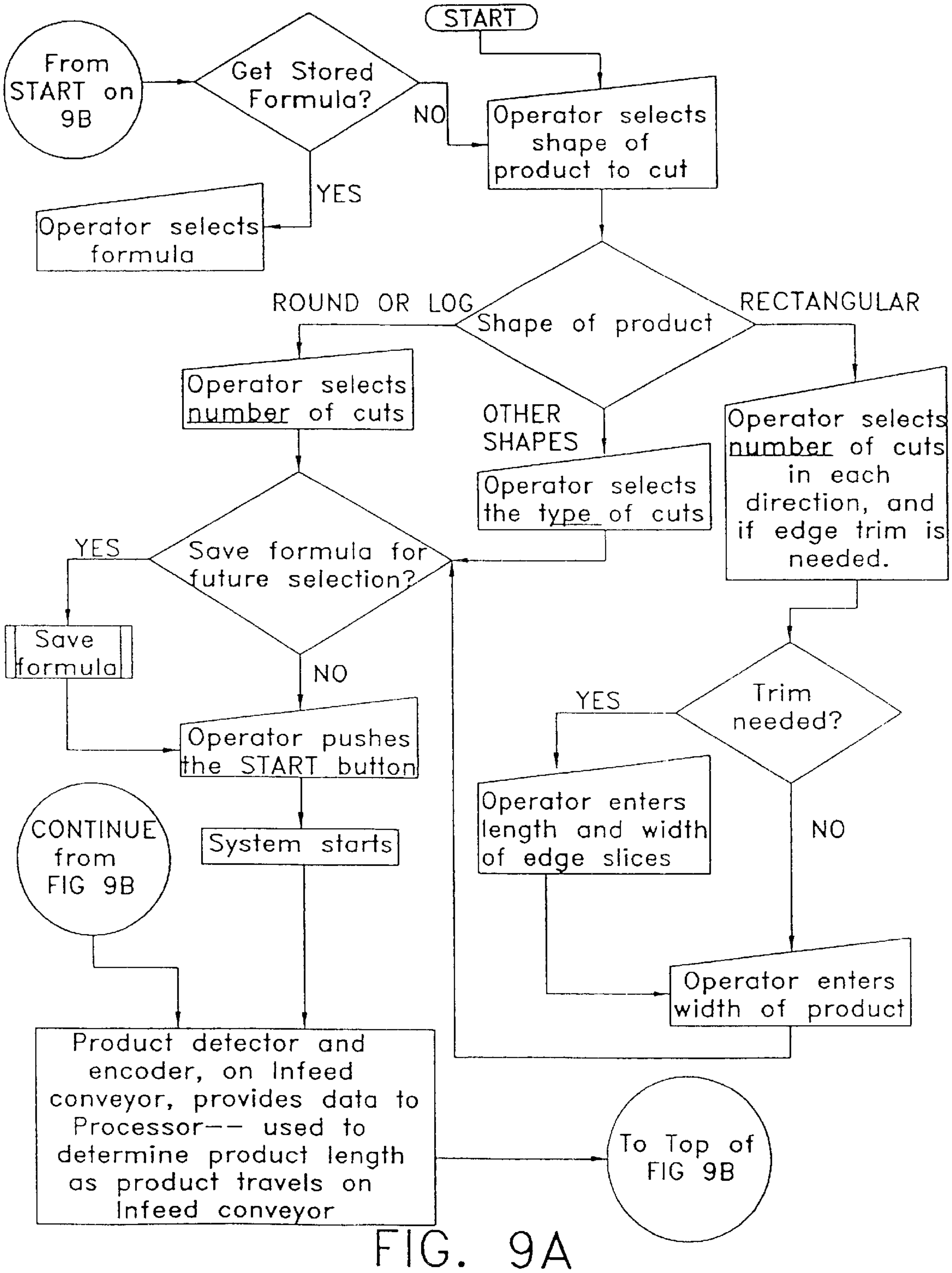
FIG. 9 is a flowchart illustrating operational program logic of the second embodiment of the present invention.
Figure 9B:
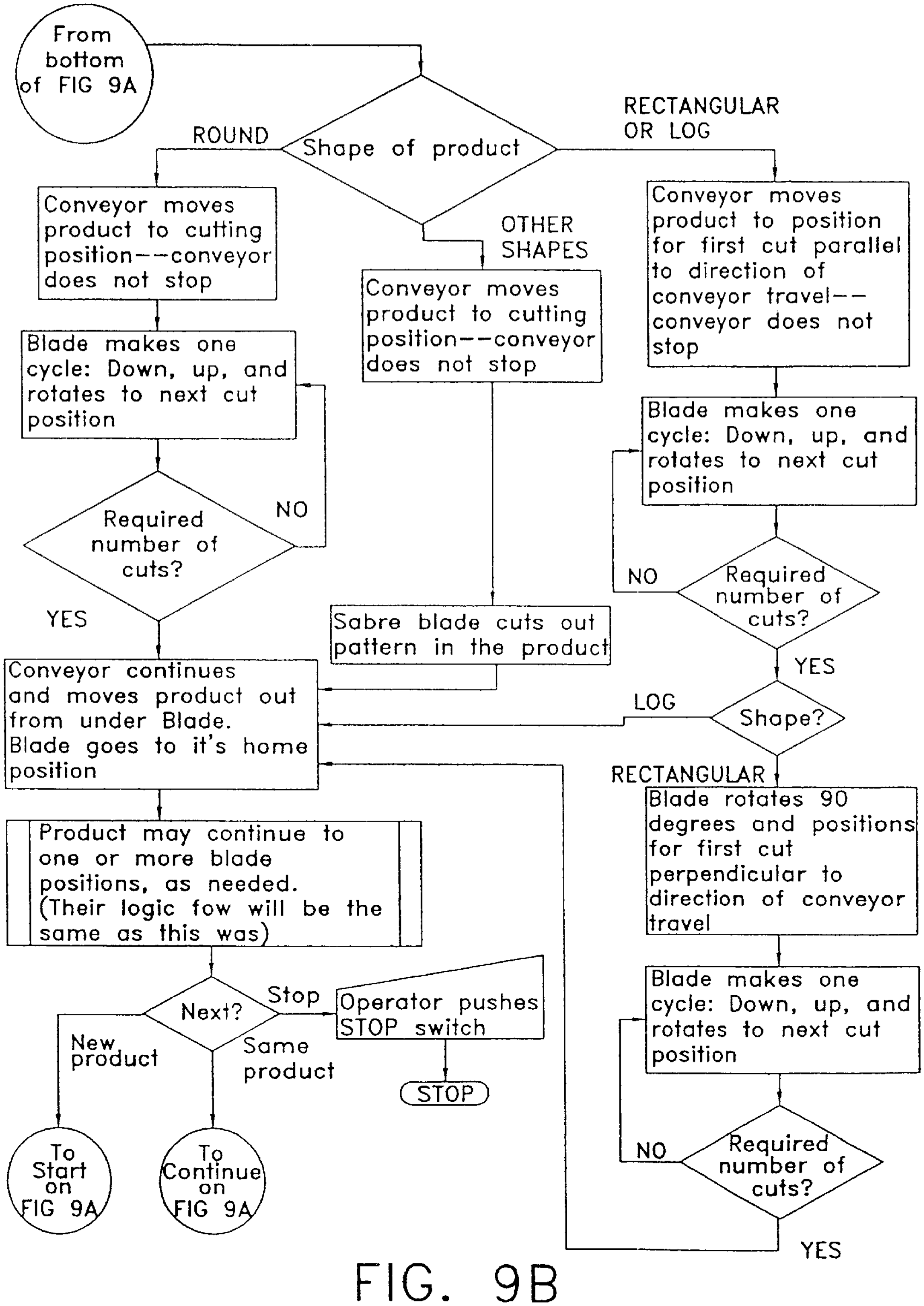

Referring to FIG. 8, an operator interface 106 is electronically connected with the processor 98. The operator interface 106 per se is of conventional design and when connected with the present invention it can be configured to allow a user to programmably select a shape of food product and a number of cuts to be given to the food product and where these selections may be saved as a formula for later use (FIGS. 9A and 9B). For example, referring to FIG. 6, a rectangular shaped food product is selected having a plurality of cuts 108 along the products width and length. Referring to FIG. 7, a round shaped food product is selected having a plurality of pie shaped cuts 92. It should be understood that food products of any size could be used, however, in baking applications round and rectangular shapes are particularly common.

Referring to FIGS. 1 and 8, an infeed gate assembly 110 is provided which is raised and lowered when a food product 18 enters or exits the cutting range 42 when the apparatus 10 is operated in accordance with the first embodiment previously described. The gate assembly 110 includes an infeed gate controller 112 (FIG. 8) which is electronically interconnected between the processor 98 and an air piston 114 of the assembly. The assembly 110 includes a pair of slider brackets 116 secured to the frame 12 in opposing space apart relationship with one another at the first end 22 of the conveyor assembly 16. A gate member 118 has opposite sides 120. Each slider bracket 116 has a channel 122 for receiving a respective side 120 in slidable engagement therewith. The gate member has the air piston 114 connected therewith for actuating the gate member.

Referring to FIGS. 9A and 9B, a flowchart is provided which illustrates program logic being carried out during operation of the second embodiment of the apparatus 10 where the conveyor 16 moves continuously during the ultrasonic cutting. It should be understood that the program logic illustrates only one preferred embodiment and that alternative program logic could be employed in accordance with the purposes of the present invention described above.

Figure 10A:
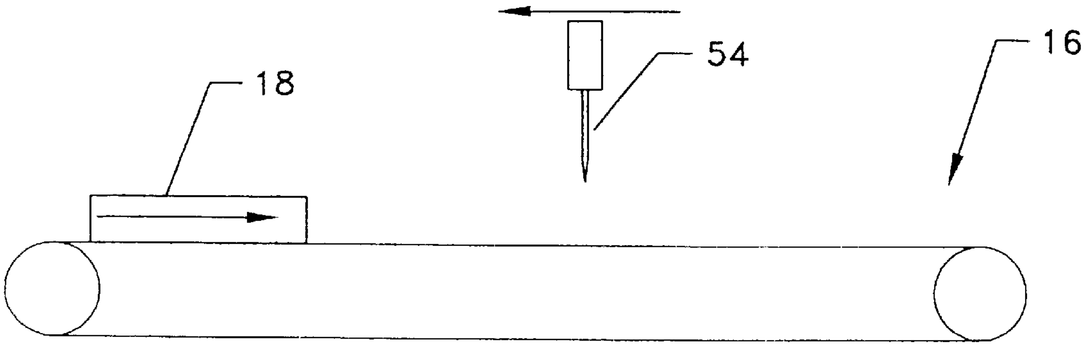
FIGS. 10A–10D are side views diagrammatically illustrating the method of operation of the second embodiment.
Figure 10B:
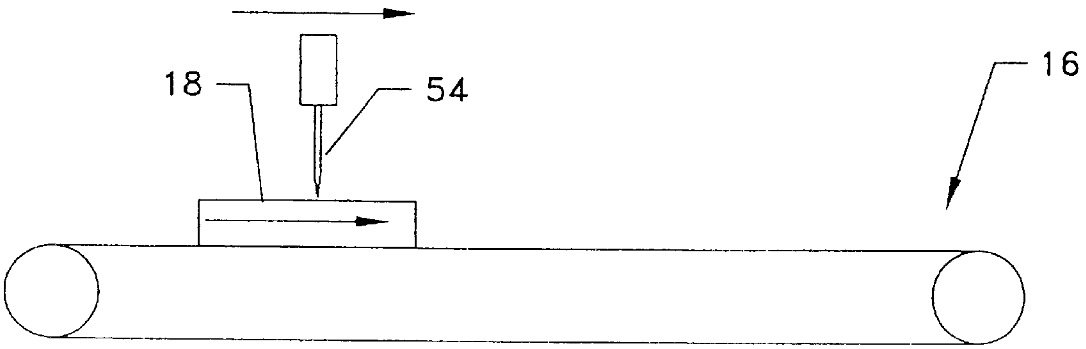
Figure 10C:
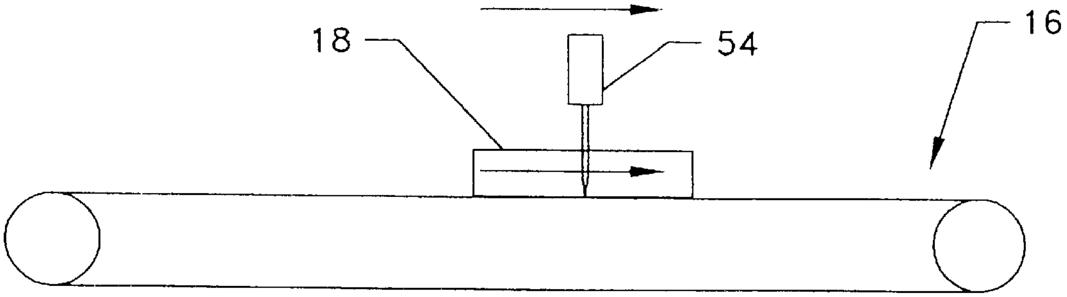
Figure 10D:
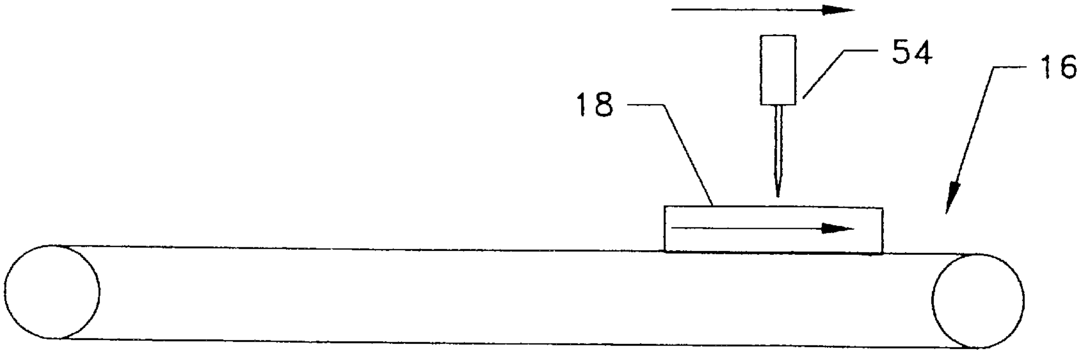

Referring to FIGS. 10A–10D, a series of consecutive side views diagrammatically illustrate the method of operation of the second embodiment taken at various time increments. In FIG. 10A, the blade 54 being actuated by a knife positioning assembly as previously described is caused to move towards a food product 18 which is moving continuously on a conveyor 16. In FIG. 10B, the blade 54 meets the food product 18 and is momentarily positioned at a stationary position whereafter the blade 54 is caused to move in a common direction and speed with the food product 18 in a cutting position. In FIG. 10C, the blade 54 is shown effectuating a cut in the food product 18 while continuing to move with the food product 18. After all desired cuts are completed, the blade 54 is shown in FIG. 10D as having reached an end of the cutting range of the blade 54 whereafter the blade 54 will be caused to reverse direction to move towards a succeeding food product 18 as shown in FIG. 10A.

Figure 11B:
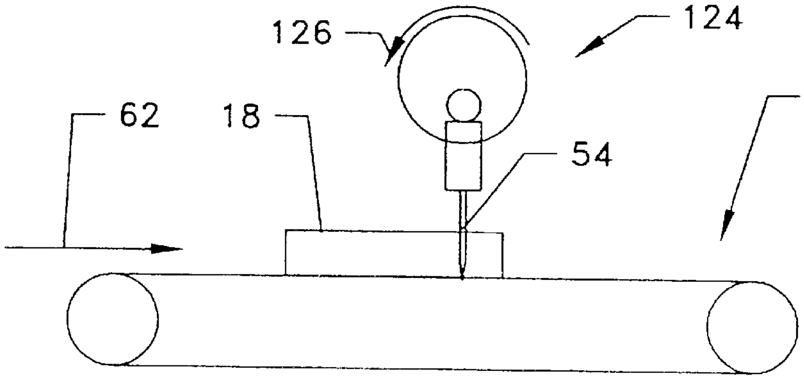
Figure 12:
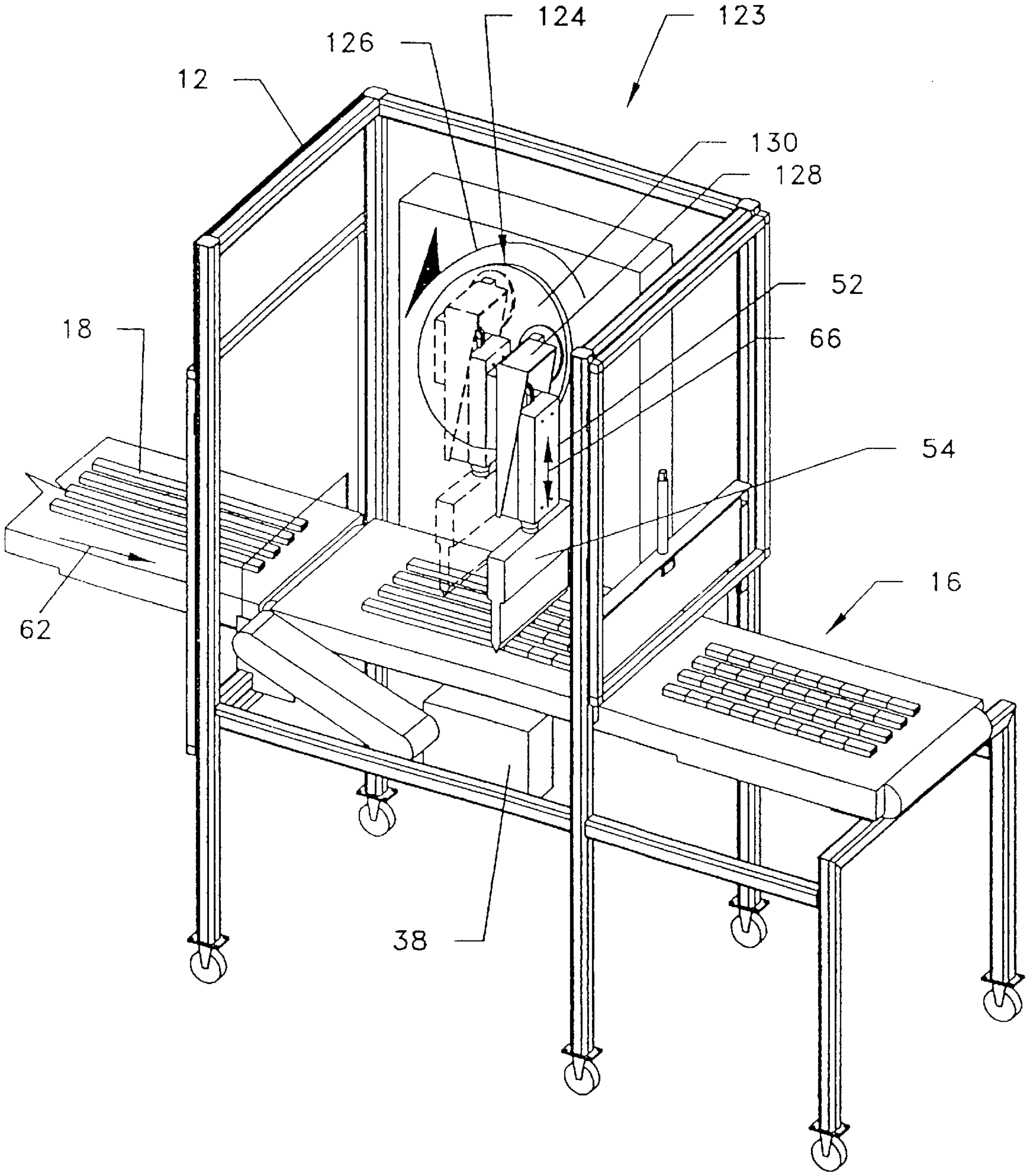
FIG. 12 is a perspective view of the third embodiment of the present invention.

Referring to FIG. 12, a third embodiment of the present invention is indicated by the numeral 123. The blade 54 of the third embodiment is operatively connected with an orbital knife positioning assembly 124. The assembly 124 provides rotary movement of the blade 54 in a vertical plane about an orbit 126 which is shown moving in a counter clockwise direction through the x-axis 62 and z-axis 66. Blade 54 is operatively connected with the ultrasonic knife assembly 52 as previously described. The knife assembly 52 is mounted to a knife support 128. The knife support 128 is rotatably mounted to a rotary mechanism 130 so that the blade 54 is maintained in a vertical plane. The rotary mechanism 130 provides the orbital movement of the assembly 124 and may include camming so that movement of the blade 54 at a lower portion of the orbit 126 (FIG. 11B) is timed to provide synchronized movement of the blade 54 with the food product 18 along the x-axis 62.

Figure 11A:
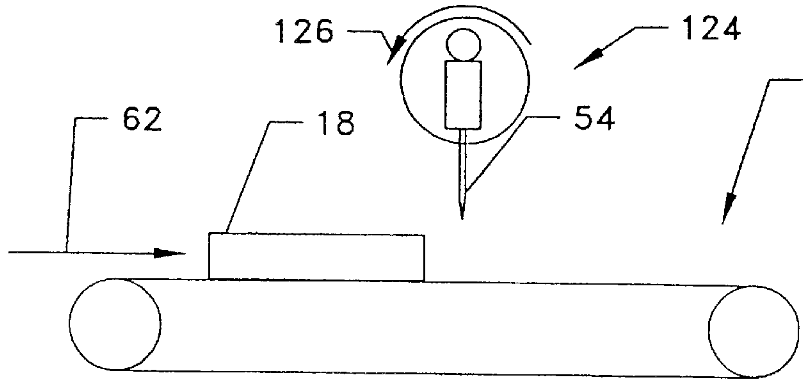
FIGS. 11A–11D are side views diagrammatically illustrating the method of operation of a third embodiment.
Figure 11C:
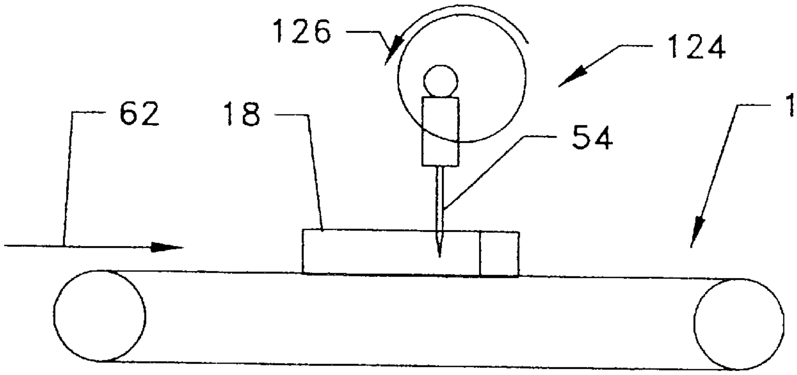
Figure 11D:
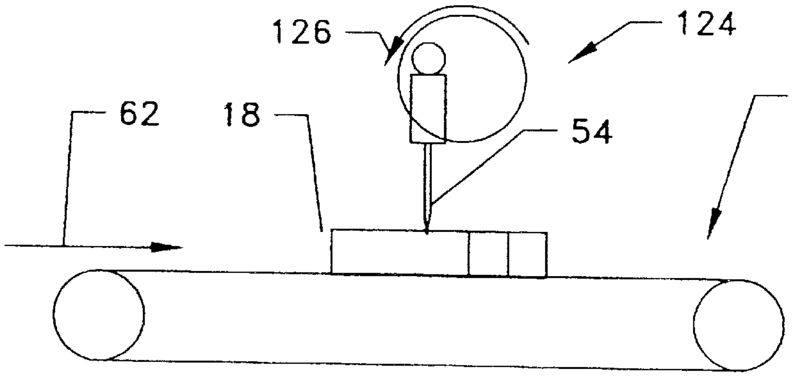

Referring to FIGS. 11A–11D, a series of consecutive side views diagrammatically illustrate the method of operation of the third embodiment taken at various time increments. In FIG. 11A, the blade 54 is actuated by the knife positioning assembly 124 as previously described and is caused to move towards a food product 18 which is moving continuously on a conveyor 16. In FIG. 11B, the blade 54 is shown in a cutting position as the blade 54 cuts the food product 18 and travels with the food product 18 at a common speed in the x-axis. Whereafter, the blade 54 is moved about the orbit 126 to form succeeding cuts in the food product 18, as shown in FIGS. 11C and 11D.

Although the invention has been described by reference to some embodiments it is not intended that the novel device be limited thereby, but that modifications thereof are intended to be included as falling within the broad scope and spirit of the foregoing disclosure, the following claims and the appended drawings.

We claim:

1. A method of ultrasonic cutting of food product by moving an ultrasonic knife assembly to the food product for movement therewith during cutting, the method comprising the steps of:

(a) providing a series of independent food product spaced apart from one another and moving the series of food products on a conveyor from an infeed end to an outfeed end;

(b) providing an ultrasonic knife assembly having a blade adapted for cutting the food product;

(c) sensing a proximity of one of said food products within a cutting range of the knife assembly;

(d) moving the knife assembly to the one of said food products in a cutting position therewith when the conveyor has moved the one of said food products within the cutting range and maintaining a rate of speed for the knife assembly synchronous to a rate of speed of the moving conveyor for maintaining the cutting position to allow the ultrasonic knife assembly to effectuate a series of preselected cuts;

(e) cutting the one of said food products with the blade of the knife assembly by vibrating the blade at an ultrasonic frequency while moving the blade into the food product; and (f) providing rotary movement of the knife assembly, and effectuating the series of preselected cuts by cutting the food product with a series of cuts intersecting one another, each cut being formed by an elongated edge of the blade being moved downward along a z-axis and retracted from the food product with the rotary movement rotating the knife assembly and the blade from its initial position to its next required position between cuts while continuously moving the knife assembly and blade at the rate of speed of the moving conveyor.

2. The method of claim 1, wherein the step of moving the knife assembly includes accelerating the knife assembly in a first direction along an x-axis to a rate of speed at least as fast as a rate of speed of the conveyor for moving the knife assembly with the food product and cutting the food product as the knife assembly is positioned in a cutting position, and moving the knife assembly in a second direction along the x-axis for moving the knife assembly to meet a succeeding food product.

3. The method of claim 2, wherein the step of moving the knife assembly includes moving the knife assembly rotationally about the z-axis.

4. The method of claim 1, wherein the step of sensing the proximity of the food product including the step of determining a dimension and position of the food product and electronically transferring the dimension and position of the food product to a control system for controlling movement of the knife assembly.

5. The method of claim 1, further including the step of selecting a shape of food product and a number of cuts to be given to the food product using an operator interface.

6. A method of ultrasonic cutting of a multi-layer food product without rendering the food product unstable, the method comprising the steps of:

(a) providing a series of independent multi-layer food products spaced apart from one another;

(b) moving the serise of food products on a conveyor from an infeed end to an outfeed end;

(c) providing an ultrasonic knife assembly having a blade adapted for cutting the food product;

(d) sensing a proximity of one of said food products within a cutting range of the knife assembly;

(e) moving the knife assembly to the one of said food products in a cutting position therewith when the conveyor has moved the one of said food products within the cutting range and maintaining a rate of speed for the knife assembly synchronous to a rate of speed of the moving conveyor for maintaining the cutting position to allow the ultrasonic knife assembly to effectuate a cut; and (f) cutting the one of said food products with the blade of the knife assembly with a series of cuts within the one of said food products by vibrating the blade at an ultrasonic frequency while moving the blade into the one of said food products with a smooth downward motion and rapid retraction of the blade from the one of said food produces to prevent the one of said food products from becoming unstable, (g) providing rotary movement of the knife assembly, and cutting the series of cuts by with a series of cuts intersecting one another, each cut being formed by an elongated edge of the blade being moved downward along a z-axis and retracted from the one of said food products with the rotary movement rotating the knife assembly and the blade from its initial position to its next required position between cuts while continuously moving the knife assembly and blade at the rate of speed of the moving conveyor.

* * * * *